(12) United States Patent
Williams et al.

(10) Patent No.: US 6,417,580 B1
(45) Date of Patent: Jul. 9, 2002

(54) POWER SUPPLY BOOSTER

(75) Inventors: Timothy J. Williams, Charlottesville; Matthew B. Pereira, Barboursville, both of VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/426,201

(22) Filed: Oct. 25, 1999

(51) Int. Cl.[7] ................................................. H02J 1/00
(52) U.S. Cl. ............................. 307/70; 307/80; 307/69; 307/18
(58) Field of Search ..................... 307/70, 69, 65, 307/85, 86, 87, 23, 29, 18, 43, 80, 150; 361/788

(56) References Cited

U.S. PATENT DOCUMENTS

| | | |
|---|---|---|
| 4,538,073 A | 8/1985 | Freige et al. |
| 4,783,728 A | 11/1988 | Hoffman |
| 4,924,170 A | 5/1990 | Henze |
| 5,097,404 A | 3/1992 | Layh |
| 5,177,372 A | 1/1993 | Yajima |
| 5,381,554 A | 1/1995 | Langer et al. |
| 5,594,286 A | 1/1997 | Tachikawa |
| 5,616,968 A * | 4/1997 | Fujii et al. ................. 307/66 |
| 5,737,208 A | 4/1998 | Chen |
| 5,886,890 A | 3/1999 | Ishida et al. |
| 5,901,057 A | 5/1999 | Brand |
| 5,969,938 A | 10/1999 | Byrne et al. |
| 5,993,241 A | 11/1999 | Olson et al. |
| 5,995,400 A | 11/1999 | Park et al. |
| 6,002,596 A | 12/1999 | Mayer et al. |
| 6,046,921 A | 4/2000 | Tracewell et al. |
| 6,121,695 A | 9/2000 | Loh |
| 6,150,738 A | 11/2000 | Yim |
| 6,181,115 B1 | 1/2001 | Perol et al. |
| 6,191,500 B1 | 2/2001 | Toy |
| 6,201,319 B1 | 3/2001 | Simonelli et al. |
| 6,205,029 B1 | 3/2001 | Byrne et al. |

* cited by examiner

Primary Examiner—Josie Ballato
Assistant Examiner—Robert L Deberadinis
(74) Attorney, Agent, or Firm—Karl Vick, Esq.; Damian Wasserbauer, Esq.; Armstrong Teasdale LLP

(57) ABSTRACT

A power supply booster module for a programmable logic controller system replaces the primary power supply for a number of modules within the system. The power supply booster module allows high power consuming or highly complex modules to be used within a programmable logic controller system. The power supply booster module eliminates the problems present in prior programmable logic controller systems where the primary power supply could not output enough current to adequately power all of the system modules or modules that have a high power requirement.

33 Claims, 4 Drawing Sheets

POWER SUPPLY BOOSTER

BACKGROUND OF THE INVENTION

This invention relates generally to power consumption in electronic systems, and more specifically to methods and apparatus for boosting power in programmable logic controller systems.

At least one known programmable logic controller system includes a plurality of installed modules, typically referred to as input/output (I/O) modules. The I/O modules consume an amount of power from a primary power supply. However, system configurations change over time and as high complexity or high power I/O modules are added to a programmable logic controller system, capability of the primary power supply is often exceeded.

In known systems, available power to a programmable logic controller system is increased by replacing the entire system with another system having a higher capacity power supply. However, a system with a higher capacity power supply is likely to have compatibility problems, for example, programming incompatibility, I/O module configuration differences, and incompatibility with the system to be controlled.

BRIEF SUMMARY OF THE INVENTION

In an exemplary embodiment, a programmable logic controller system includes a power supply booster module configured to supply power to a number of I/O modules in the programmable logic controller system. The power supply booster module is further configured to electrically interface and mechanically interface to any of a plurality of I/O modules present in the programmable logic controller system.

In particular, the power supply booster module increases programmable logic controller primary power supply capacity. More particularly, the power supply booster module provides power in addition to power provided by a primary power supply. The power supply booster module is installed in a programmable logic controller system by separating electrically and mechanically two of a plurality of I/O modules in a system and inserting the power supply booster in between the two I/O modules. Separating I/O modules disconnects the separated I/O modules from the primary power supply since power busses are connected serially through I/O modules. The power supply booster module then supplies power to a subset of a plurality of I/O modules via a second set of power busses created by separating the I/O modules. Specifically, separating the two I/O modules removes primary power supply power from I/O modules not located between the primary power supply and a power supply booster module. The power supply booster module supplies power to the I/O modules located other than between the primary power supply and the power supply booster module. It is possible to use a plurality of power supply booster modules within a programmable logic controller system.

The above described power supply booster module allows programmable logic controller power supply capacity to be tailored to requirements of an individual application. The power supply booster module eliminates the need for individual programmable logic controller power supply capacity to be set by worst case conditions.

DETAILED DESCRIPTION OF THE INVENTION

Figure 1:
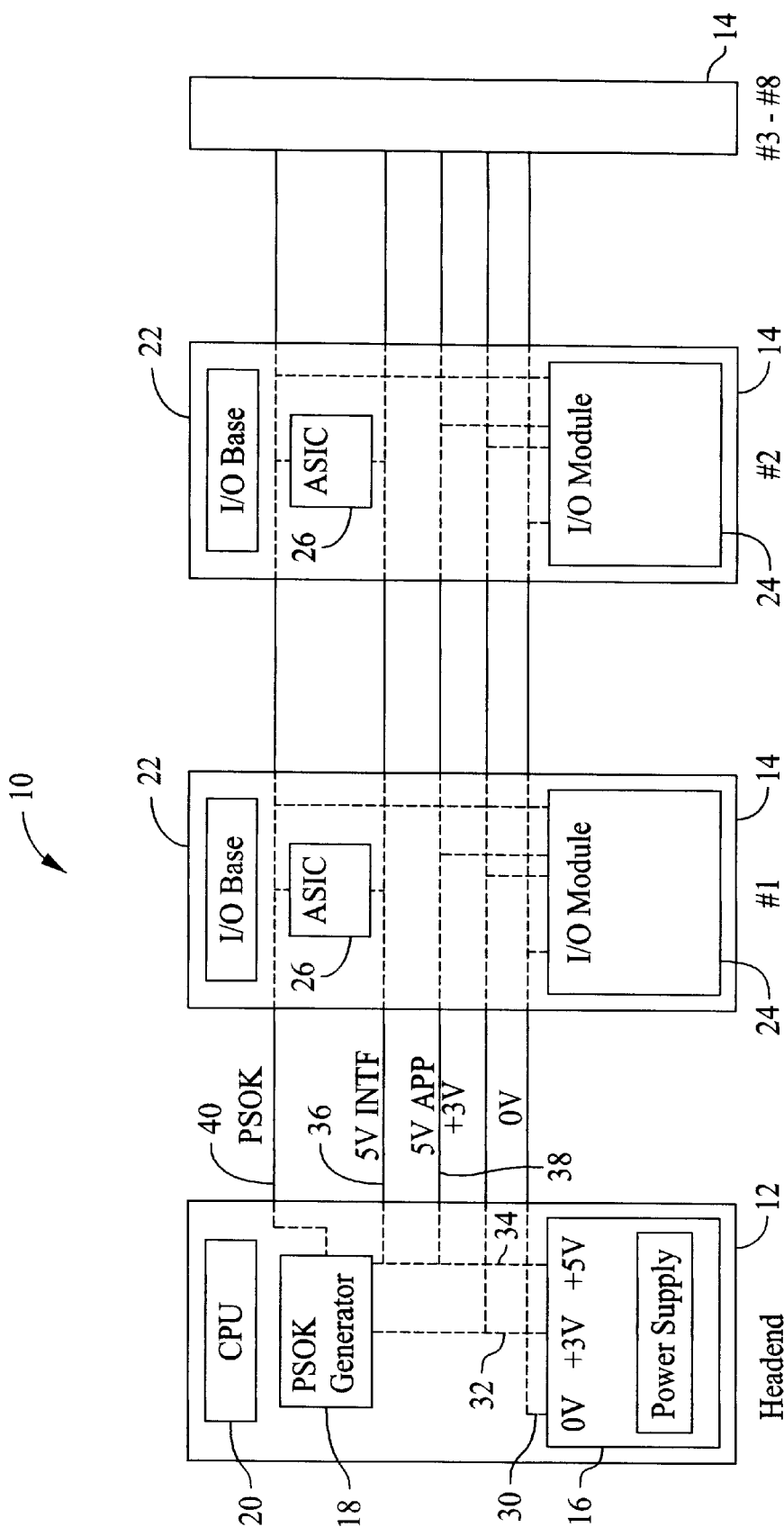
FIG. 1 is a schematic illustration of a known programmable logic controller system including eight I/O modules and one primary power supply.

FIG. 1 is a schematic illustration of an existing programmable logic controller system 10. Programmable logic controller system 10 includes a headend unit 12 and a plurality of modules 14, which for illustration purposes are numbered #1 through #8 and called input/output (I/O) modules. Headend unit 12 includes a primary power supply 16, a power supply status generator 18, and a central processing unit (CPU) 20. I/O modules 14 include module bases 22, which further include input/output circuits 24 and an application specific integrated circuit (ASIC) 26. Primary power supply 16 supplies a plurality of voltages to I/O modules 14. In one embodiment, a 0 volt reference 30, a +3 volt supply 32, and a +5 volt supply 34 are supplied by primary power supply 16. 0 volt reference 30 and +5 volt supply 34 are routed within headend unit 12 to power supply status generator 18.

Headend unit 12 splits the +5 volt supply 34 into a first +5 volt supply 36 and a second +5 volt supply 38. Headend unit 12 further supplies all voltages (0 volt reference 30, +3 volt supply 32, first +5 volt supply 36, and second +5 volt supply 38) to I/O modules 14 as series connected busses. Headend unit 12 also supplies a power supply status signal 40 to all I/O modules 14. Power supply status signal 40 is also typically electrically connected an output circuit (not shown) that is typically electrically connected to a device (not shown), for example, a light emitting diode (LED) that indicates that the system 10 is functioning properly.

In I/O module 14, second +5 volt supply 38, +3 volt supply 32, 0 volt reference 30, and power supply status signal 40 are routed to input/output circuits 24. In addition, power supply status signal 40 and first +5 volt supply 36 are routed to ASIC 26.

Figure 2:
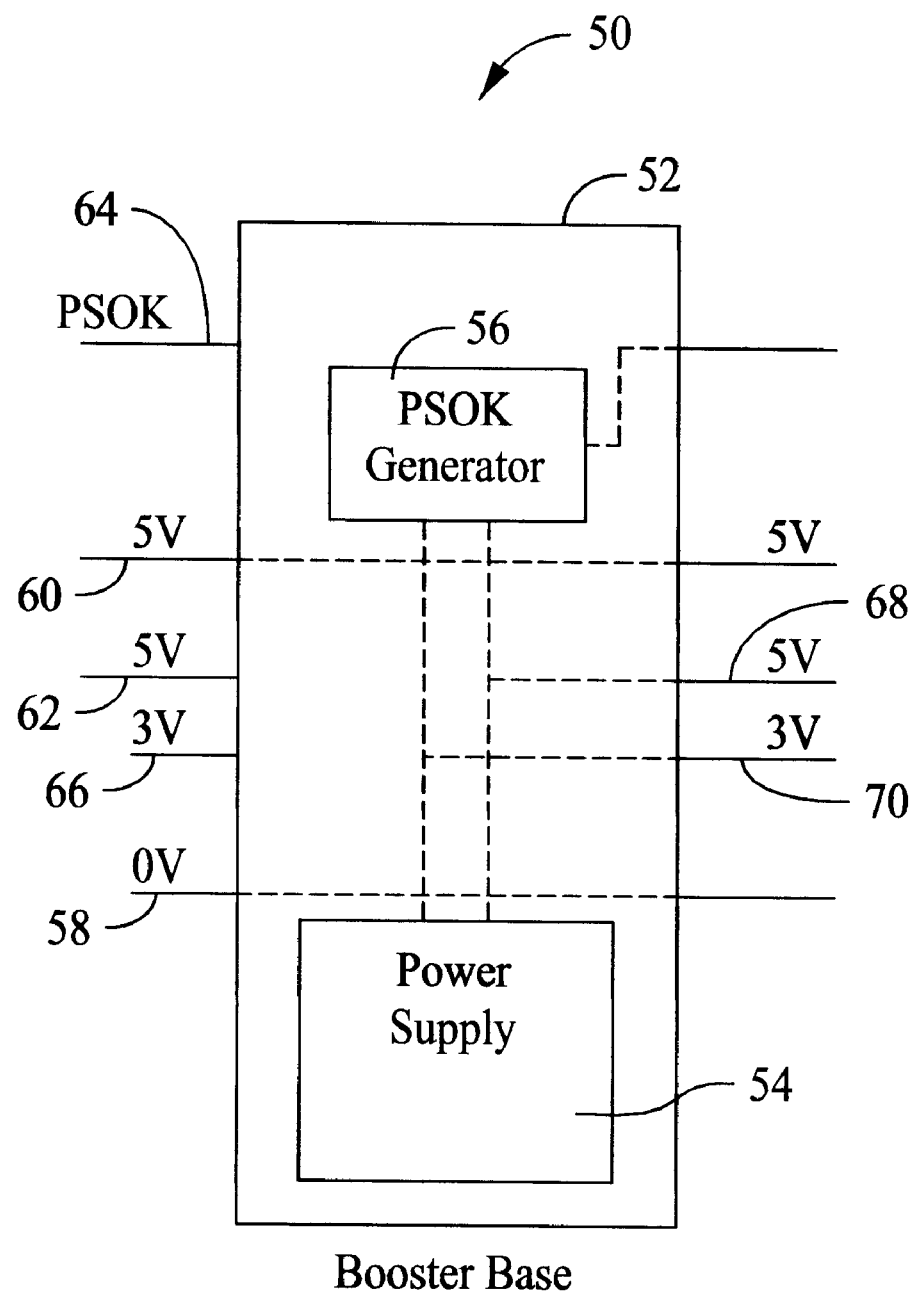
FIG. 2 is a schematic illustration of a power supply booster module.

FIG. 2 illustrates one embodiment of a power supply booster module 50. Power supply booster module 50 includes a power supply booster base 52 including a booster power supply 54 and a booster power supply status generator 56. Power supply booster module 50 is electrically connected to an external power source (not shown), for example, 110 Volts AC to supply power to booster power supply 54. Booster power supply 54 rectifies the external power source to generate supply voltages required by the system to be powered. A 0 volt reference 58 and a first +5 volt supply 60 from a primary power supply (not shown) pass through power supply booster module 50 to I/O modules (not shown) in a programmable logic controller system (not shown). Second +5 volt supply 62, power supply status signal 64, and +3 volt supply 66 from the primary power supply are not routed through power supply booster module 50. Instead, booster power supply 54 supplies a boosted +5 volt supply 68 and a boosted +3 volt supply 70 to booster power supply status generator 56 and to the I/O modules in the system, respectively.

Figure 3:
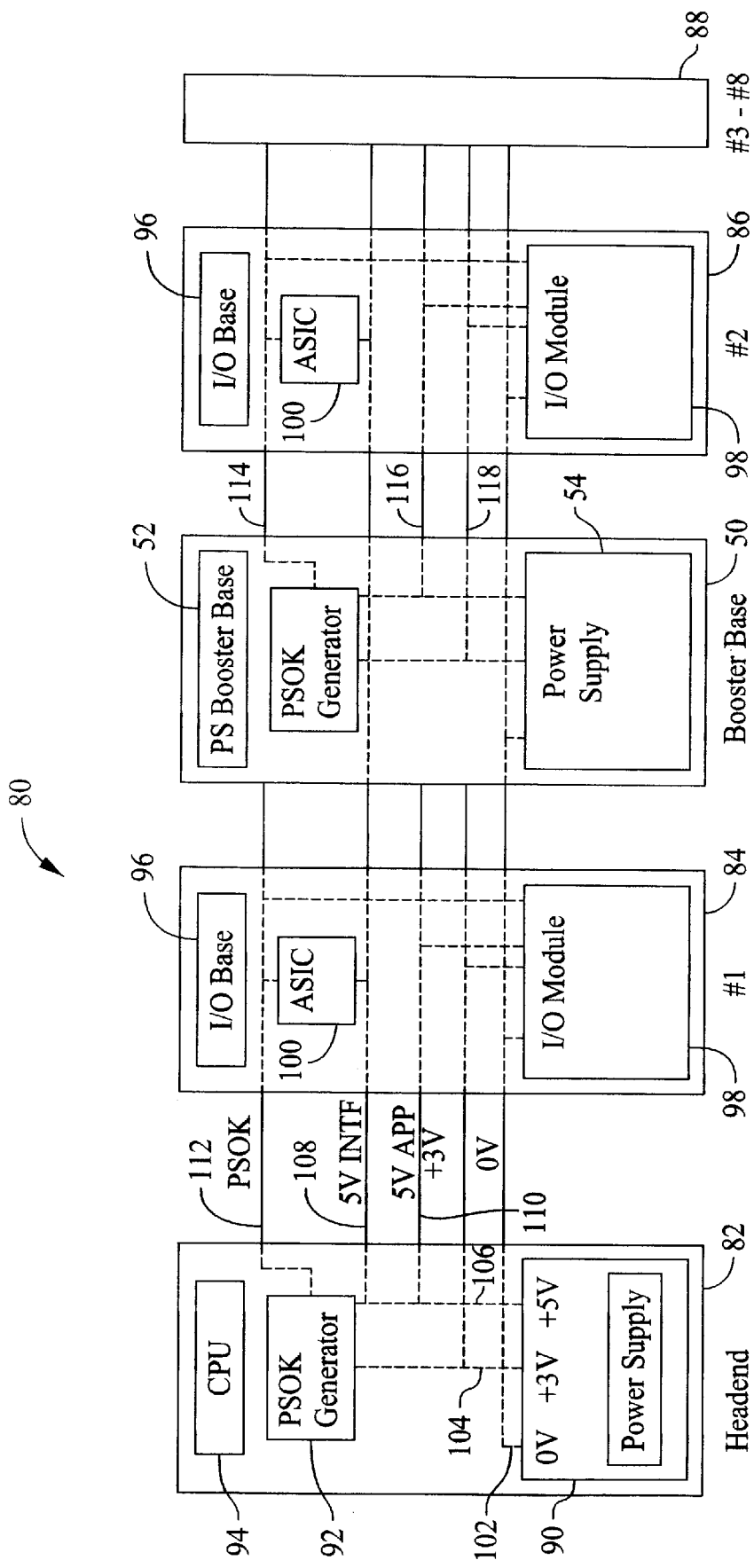
FIG. 3 is a schematic illustration of the programmable logic controller system shown in FIG. 1 wherein a power supply booster module has been placed in between two of the eight I/O modules.

FIG. 3 illustrates a programmable logic controller system 80 with a power supply booster module 50 installed. Programmable logic controller system 80 includes a headend unit 82 and a plurality of I/O modules 84, 86, and 88. I/O module 88 is labeled #3 through #8 to represent a plurality of I/O modules and indicates that system 80 is not limited to the I/O module 84 and 86 which are depicted in detail. A power supply booster module 50 has been inserted in between I/O modules 84 and 86. Headend unit 82 includes a primary power supply 90, a power supply status generator 92, and a central processing unit (CPU) 94. I/O modules 84, 86, and 88 include module bases 96, which further include input/output circuits 98 and an application specific integrated circuit (ASIC) 100. Primary power supply 90 supplies a plurality of voltages. In one embodiment, a 0 volt reference 102, a +3 volt supply 104, and a +5 volt supply 106 are supplied by primary power supply 90. 0 volt reference 102 and +5 volt supply 106 are routed within headend unit 82 to power supply status generator 92.

Headend unit 82 splits the +5 volt supply 106 into a first +5 volt supply 108 and a second +5 volt supply 110. Headend unit 82 further supplies all voltages (0 volt reference 102, +3 volt supply 104, first +5 volt supply 108, and second +5 volt supply 110) to I/O module 84 as series connected busses. Headend unit 82 also supplies a power supply status signal 112 to I/O module 84. Power supply status signal 112 is also typically electrically connected to an output circuit (not shown) which drives a device (not shown), for example, a light emitting diode (LED) that indicates that the system 80 is functioning properly.

Second +5 volt supply 110, +3 volt supply 104, 0 volt reference 102, and power supply status signal 112 are routed within input/output module 84, to input/output circuits 98. In addition, power supply status signal 112 and first +5 volt supply 108 are routed to ASIC 100.

Referring to power supply booster module 50, it is seen that power supply status signal 112, second +5 volt supply 110, and +3 volt supply 104 from headend unit 82 are supplied to I/O module 84 and are interrupted at power supply booster module 50.

Power supply booster module 50 has been positioned intermediate two I/O modules 84 and 86. Power supply booster module 50 generates a booster status signal 114, a boosted +5 volt supply 116, and a boosted +3 volt supply 118 for supplying successive I/O modules 86 and 88 in order to replace power supply status signal 112, second +5 volt supply 110, and +3 volt supply 104 signals that are interrupted by the separation of I/O modules 84 and 86. The configuration of power supply booster module 50 enables the use of several power supply booster modules 50 within a system.

Figure 4:
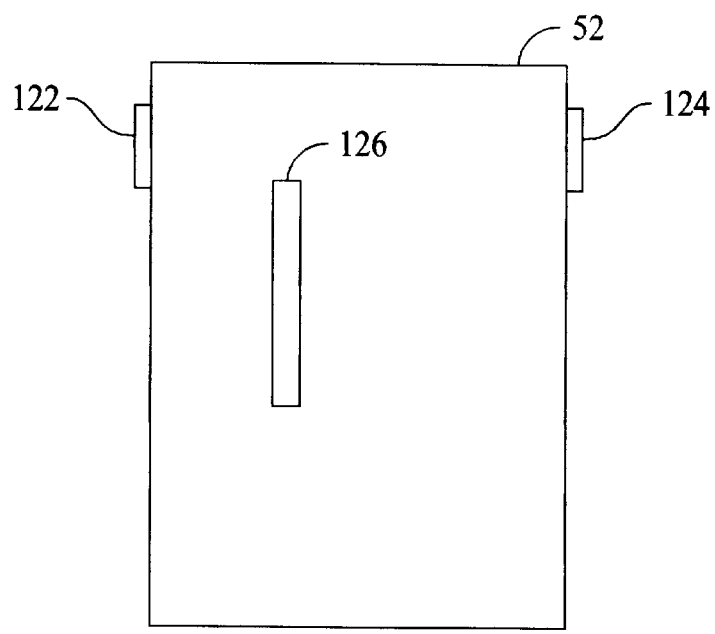
FIG. 4 is an illustration of an electro-mechanical interface to a known module base.

FIG. 4 illustrates power supply booster base 52, which is mechanically equivalent to module base 96 (shown in FIG. 3). Power supply booster base 52 includes control and data connectors 122 and 124, and booster power supply connector 126. Specifically, power supply booster base 52 is coupled to CPU 94 (shown in FIG. 3) using control and data connectors 122 and 124 to couple control and data signals to successive I/O modules 86 and 88 (shown in FIG. 3). Booster power supply 54 is coupled to power supply booster base 52 and control and data connector 124 via booster power supply connectors 126.

Figure 5:
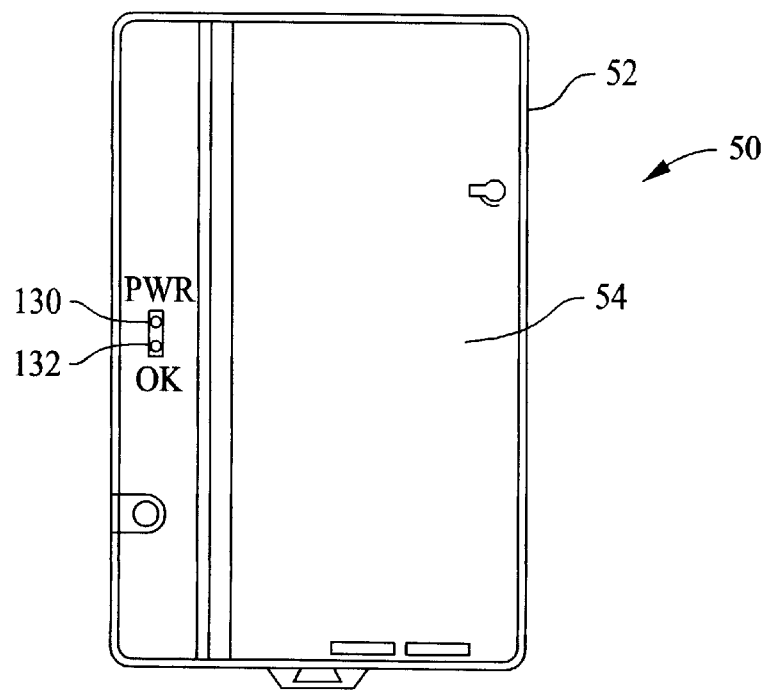
FIG. 5 is a top view of one embodiment of the power supply booster module shown in FIG. 3.

FIG. 5 illustrates one embodiment of power supply booster module 50 including a first light emitting diode (LED) 130 and a second light emitting diode (LED) 132. First LED 130 is configured to indicate that the voltages supplied for I/O modules 86 and 88 (shown in FIG. 3) by booster power supply 54 located in power supply booster base 52 are within tolerance. First LED 130 thus indicates that, thus the power supply booster module is functioning properly. Second LED 132 indicates that the entire system 80 is functioning properly and is a logical AND of first +5 volt supply 108, generated by primary power supply 90, and the voltages generated by booster power supply 54. Second LED 132 is a substitute for the output circuit (not shown) electrically connected to power supply status signal 112 (shown in FIG. 3) since inserting a power supply booster module 50 (shown in FIG. 3) disconnects a portion of system 80 (shown in FIG. 3) from headend unit 82 including the output circuit (not shown).

By using the power supply booster described above, flexibility in selecting combinations of I/O modules and power supply boosters for all applications is achieved without exceeding primary power supply capacity or having to use several different types of systems for varying requirements.

While the invention has been described in terms of various specific embodiments, those skilled in the art will recognize that the invention can be practiced with modification within the spirit and scope of the claims.

What is claimed is:

1. A method for boosting available power to at least one module in an electronic system, the electronic system including a primary power supply, a plurality of modules, and at least one power bus routed in series from the primary power supply through each module, said method comprising the steps of:

opening the serial power bus supplied by the primary power supply by separating at least one module from the plurality of modules in the electronic system at a point along the bus to create two series power busses, one powered and one unpowered; and connecting a second power source intermediate the powered series bus and the unpowered series power bus.

2. A method according to claim 1 wherein said step of connecting a second power source further comprises the step of connecting a power supply booster module supplying at least one voltage.

3. A method according to claim 2 wherein said step of connecting a second power source further comprises the step of connecting a power supply booster module supplying a +5 volt supply.

4. A method according to claim 2 wherein said step of connecting a second power source further comprises the step of connecting a power supply booster module supplying a +3 volt supply.

5. A method according to claim 1 wherein said step of connecting a second power source further comprises the step of connecting a power supply booster module supplying two voltages.

6. A method according to claim 5 wherein said step of connecting a second power source further comprises the step of connecting a power supply booster module supplying a +5 volt supply and a +3 volt supply.

7. A method according to claim 1 wherein said step of connecting a second power source further comprises the step of connecting a power supply booster module generating a first status signal which signifies a status of the power supply booster module.

8. A method according to claim 1 wherein said step of connecting a second power source further comprises the step of connecting a power supply booster module that supplies a first status signal to modules being supplied with a voltage from the power supply booster module.

9. A method according to claim 8 wherein said step of connecting a second power source further comprises the step of connecting a power supply booster module wherein a first status signal is configured to illuminate a first light emitting diode (LED) mounted in the power supply booster module.

10. A method according to claim 8 wherein said step of connecting a second power source further comprises the step of connecting a power supply booster module wherein the power supply booster module generates a second status signal which signifies status of the booster power supply and a first +5 volt supply supplied by a primary power supply.

11. A method according to claim 10 wherein said step of connecting a second power source further comprises the step of connecting a power supply booster module wherein a second status signal configured to illuminate a second light emitting diode (LED) mounted in a power supply booster module.

12. A method according to claim 8 wherein said step of connecting a second power source further comprises the step of connecting a power supply booster module wherein the power supply booster module generates a second status signal which signifies status of the electronic system.

13. A method according to claim 1 wherein said step of connecting a second power source further comprises the step of connecting a power supply booster module including a power supply booster base configured with a mechanical interface compatible with a module base.

14. A method according to claim 1 wherein said step of connecting a second power source further comprises the step of connecting a power supply booster module including a booster power supply configured to use an external power source.

15. A power supply booster module for an electronic system including a primary power supply and a plurality of modules, the plurality of modules including at least a first module and a second module, the primary power supply configured to supply voltage to the first module, said power supply booster module comprising:

a power supply booster base configured to be mechanically and electrically coupled to the electronic system between the first module and the second module; and a booster power supply coupled to said power supply booster base, said booster power supply and said power supply booster base configured to supply voltage to the second module.

16. A power supply booster module according to claim 15 wherein said power supply booster base couples a first +5 volt supply supplied by a primary power supply through said power supply booster module.

17. A power supply booster module according to claim 15 wherein said booster power supply configured to supply at least one voltage.

18. A power supply booster module according to claim 17 wherein said at least one voltage is a second +5 volt supply.

19. A power supply booster module according to claim 17 wherein said at least one voltage is a +3 volt supply.

20. A power supply booster module according to claim 15 wherein said booster power supply configured to supply two voltages.

21. A power supply booster module according to claim 20 wherein said two voltages are a second +5 volt supply and a +3 volt supply.

22. A power supply booster module according to claim 15 wherein said power supply booster module configured to generate a first status signal signifying a status of the booster power supply.

23. A power supply booster module according to claim 22 wherein said first status signal is supplied to modules being supplied with a voltage by said power supply booster module.

24. A power supply booster module according to claim 22 wherein said first status signal is configured to illuminate a first light emitting diode (LED) mounted in said power supply booster module.

25. A power supply booster module according to claim 22 wherein said power supply booster module is configured to generate a second status signal signifying a status of the booster power supply and a first +5 volt supply supplied by a primary power supply.

26. A power supply booster module according to claim 25 wherein said second status signal configured to illuminate a second light emitting diode (LED) mounted in said power supply booster module.

27. A power supply booster module according to claim 22 wherein said power supply booster module is configured to generate a second status signal signifying a status of the electronic system.

28. A power supply booster module according to claim 27 wherein said second status signal configured to illuminate a second light emitting diode (LED) mounted in said power supply booster module.

29. A power supply booster module according to claim 15 wherein said power supply booster base configured with a mechanical interface compatible with a module base.

30. A power supply booster module according to claim 15 wherein said booster power supply configured to use an external power source.

31. A method for boosting available power to several modules in an electronic system, the electronic system including a primary power supply, a plurality of modules each installed in the electronic system, at least one power bus routed in series from the primary power supply through each module, said method comprising the steps of:

opening the serial power bus supplied by the primary power supply by separating modules in the electronic system at a point along the bus to create multiple series power busses, one powered and at least one unpowered; and connecting a power source at a point along each unpowered series power bus.

32. A method according to claim 31 wherein said step of connecting a power source at a point along each unpowered series power bus further comprises the step of installing a power supply booster module at a point along each unpowered series power bus.

33. A method according to claim 31 wherein said step of connecting a power source at a point along each unpowered series power bus further comprises the step of installing a power supply booster module at a point intermediate each two separated modules.

* * * * *